(12) United States Patent
Dempewolf et al.

(10) Patent No.: US 6,343,169 B1
(45) Date of Patent: Jan. 29, 2002

(54) ULTRA-DENSE WAVELENGTH DIVISION MULTIPLEXING/DEMULTIPLEXING DEVICE

(75) Inventors: Joseph R. Dempewolf, Des Montes, NM (US); Robert K. Wade, Boca Raton, FL (US); Ian Turner, Stratham, NH (US)

(73) Assignee: LightChip, Inc., Salem, NH (US)

( * ) Notice: Subject to any disclaimer, the term of this patent is extended or adjusted under 35 U.S.C. 154(b) by 0 days.

(21) Appl. No.: 09/583,764

(22) Filed: May 31, 2000

Related U.S. Application Data (63) Continuation-in-part of application No. 09/392,831, filed on Sep. 8, 1999, now Pat. No. 6,181,853, and a continuation-in-part of application No. 09/392,670, filed on Sep. 8, 1999, and a continuation-in-part of application No. 09/382,624, filed on Aug. 25, 1999, now Pat. No. 6,271,970, and a continuation-in-part of application No. 09/382,492, filed on Aug. 25, 1999, and a continuation-in-part of application No. 09/363,042, filed on Jul. 29, 1999, now Pat. No. 6,236,780, and a continuation-in-part of application No. 09/363,041, filed on Jul. 29, 1999, now Pat. No. 6,243,513, and a continuation-in-part of application No. 09/342,142, filed on Jun. 29, 1999, and a continuation-in-part of application No. 09/323,094, filed on Jun. 1, 1999, now Pat. No. 6,263,135, and a continuation-in-part of application No. 09/257,045, filed on Feb. 25, 1999, now Pat. No. 6,137,933.

(51) Int. Cl.$^7$ .................................................. G02B 6/34

(52) U.S. Cl. ............................. 385/37; 385/24; 359/130

(58) Field of Search .............................. 385/37, 24, 14, 385/46, 33, 34; 359/130, 131; 372/50

(56) References Cited

U.S. PATENT DOCUMENTS

| | | | |
|---|---|---|---|
| 4,111,524 A | 9/1978 | Tomlinson, III | 350/96.19 |
| 4,153,330 A | 5/1979 | Tomlinson, III | 350/96.17 |
| 4,198,117 A | 4/1980 | Kobayashi | 350/96.19 |
| 4,274,706 A | 6/1981 | Tangonan | 350/96.19 |
| 4,279,464 A | 7/1981 | Colombini | 350/96.19 |
| 4,299,488 A | 11/1981 | Tomlinson, III | 356/328 |
| 4,343,532 A | 8/1982 | Palmer | 350/96.19 |
| 4,387,955 A | 6/1983 | Ludman et al. | 350/96.19 |
| 4,479,697 A | 10/1984 | Kapany et al. | 350/96.18 |

(List continued on next page.)

OTHER PUBLICATIONS

G. R. Harrison, Ph.D., Sc.D. et al., Practical Spectroscopy, Chapter 4—Diffraction–Grating Spectrographs, Prentice–Hall (1948).

W. J. Tomlinson, Wavelength multiplexing in multimode optical fibers, Applied Optics, vol. 16, No. 8 (Aug. 1977).

W.J. Tomlinson et al., Optical multiplexer for multimode fiber transmission systems, Appl. Phys. Lett., vol. 31, No. 3 (Aug. 1977).

(List continued on next page.)

*Primary Examiner*—Phan T. H. Palmer
(74) *Attorney, Agent, or Firm*—Hunton & Williams (57) ABSTRACT

A family of ultra-dense wavelength division multiplexing/demultiplexing devices are disclosed. In the case of an ultra-dense wavelength division multiplexing device, a wavelength division multiplexing device is used for combining at least one plurality of monochromatic optical beams into a corresponding at least one single, multiplexed, polychromatic optical beam, wherein the wavelength division multiplexing device has an input element and an output element. A plurality of optical input devices is disposed proximate the input element, wherein each of the plurality of optical input devices communicates a plurality of monochromatic optical beams to the wavelength division multiplexing device for combining the plurality of monochromatic optical beams into a single, multiplexed, polychromatic optical beam. A corresponding plurality of optical output devices is disposed proximate the output element, wherein each of the plurality of optical output devices receives a corresponding single, multiplexed, polychromatic optical beam.

30 Claims, 5 Drawing Sheets

U.S. PATENT DOCUMENTS

| | | | | |
|---|---|---|---|---|
| 4,522,462 A | 6/1985 | Large et al. | ............. | 350/96.19 |
| 4,583,820 A | 4/1986 | Flamand et al. | ......... | 350/96.19 |
| 4,622,662 A | 11/1986 | Laude et al. | .................... | 370/3 |
| 4,626,069 A | 12/1986 | Dammann et al. | ........ | 350/162.2 |
| 4,634,215 A | 1/1987 | Reule | ..................... | 350/96.16 |
| 4,643,519 A | 2/1987 | Bussard et al. | .......... | 350/96.19 |
| 4,652,080 A | 3/1987 | Carter et al. | ............. | 350/96.19 |
| 4,671,607 A | 6/1987 | Laude | ..................... | 350/96.15 |
| 4,703,472 A | 10/1987 | Blumentritt et al. | ........... | 370/3 |
| 4,708,425 A | 11/1987 | Gouali et al. | ............ | 350/96.16 |
| 4,726,645 A | 2/1988 | Yamashita et al. | ........ | 350/96.18 |
| 4,740,951 A | 4/1988 | Lizet et al. | ..................... | 370/3 |
| 4,741,588 A | 5/1988 | Nicia et al. | ............. | 350/96.19 |
| 4,744,618 A | 5/1988 | Mahlein | .................. | 350/96.19 |
| 4,746,186 A | 5/1988 | Nicia | ..................... | 350/96.13 |
| 4,748,614 A | 5/1988 | Dammann et al. | ............ | 370/3 |
| 4,749,247 A | 6/1988 | Large | ..................... | 350/96.16 |
| 4,752,108 A | 6/1988 | Vollmer | .................. | 350/96.12 |
| 4,760,569 A | 7/1988 | Mahlein | ........................ | 350/3 |
| 4,763,969 A | 8/1988 | Khoe et al. | ............. | 350/96.19 |
| 4,773,063 A | 9/1988 | Hunsperger et al. | ........... | 370/3 |
| 4,786,133 A | 11/1988 | Gidon et al. | ............. | 350/96.19 |
| 4,819,224 A | 4/1989 | Laude | ............................ | 370/3 |
| 4,834,485 A | 5/1989 | Lee | ........................ | 350/96.19 |
| 4,836,634 A | 6/1989 | Laude | ..................... | 350/96.19 |
| 4,857,726 A | 8/1989 | Kinney et al. | .............. | 250/226 |
| 4,923,271 A | 5/1990 | Henry et al. | ............. | 350/96.19 |
| 4,926,412 A | 5/1990 | Jannson et al. | ................. | 370/3 |
| 4,930,855 A | 6/1990 | Clark et al. | ............. | 350/96.19 |
| 4,934,784 A | 6/1990 | Kapany et al. | .......... | 350/96.18 |
| 5,026,131 A | 6/1991 | Jannson et al. | .............. | 350/3.7 |
| 5,107,359 A | 4/1992 | Ohuchida | ................... | 359/124 |
| 5,170,451 A | 12/1992 | Ohshima | ..................... | 385/43 |
| 5,228,103 A | 7/1993 | Chen et al. | ................... | 385/14 |
| 5,278,687 A | 1/1994 | Jannson et al. | ............. | 359/125 |
| 5,355,237 A | 10/1994 | Lang et al. | ................. | 359/130 |
| 5,363,220 A | 11/1994 | Kuwayama et al. | ........... | 359/3 |
| 5,440,416 A | 8/1995 | Cohen et al. | ............... | 359/127 |
| 5,442,472 A | 8/1995 | Skrobko | ..................... | 359/110 |
| 5,450,510 A | 9/1995 | Boord et al. | ................. | 385/37 |
| 5,457,573 A | 10/1995 | Iida et al. | .................. | 359/569 |
| 5,500,910 A | 3/1996 | Boudreau et al. | ............ | 385/24 |
| 5,513,289 A | 4/1996 | Hosokawa et al. | ........... | 385/33 |
| 5,526,155 A | 6/1996 | Knox et al. | ................. | 359/130 |
| 5,541,774 A | 7/1996 | Blankenbecler | ............ | 359/653 |
| 5,555,334 A | 9/1996 | Ohnishi et al. | ............... | 385/43 |
| 5,583,683 A | 12/1996 | Scobey | ....................... | 359/127 |
| 5,606,434 A | 2/1997 | Feldman et al. | ............... | 359/3 |
| 5,657,406 A | 8/1997 | Ball | ........................... | 385/24 |
| 5,703,722 A | 12/1997 | Blankenbecler | ............ | 359/653 |
| 5,742,416 A | 4/1998 | Mizrahi | ....................... | 359/134 |
| 5,745,270 A | 4/1998 | Koch | ........................ | 359/124 |
| 5,745,271 A | 4/1998 | Ford et al. | .................. | 359/130 |
| 5,745,612 A | 4/1998 | Wang et al. | .................... | 385/24 |
| 5,748,350 A | 5/1998 | Pan et al. | ..................... | 359/130 |
| 5,748,815 A | 5/1998 | Hamel et al. | ................. | 385/37 |
| 5,768,450 A | 6/1998 | Bhagavatula | ................ | 385/24 |
| 5,777,763 A | 7/1998 | Tomlinson, III | ............ | 359/130 |
| 5,880,834 A | 3/1999 | Chrisp | ........................ | 356/328 |
| 6,256,436 B1 * | 7/2001 | Nakama | ....................... | 385/37 |
| 6,263,134 B1 * | 7/2001 | Laude | .......................... | 385/37 |

OTHER PUBLICATIONS

W. J. Tomlinson et al., Optical wavelength–division–multiplexer for the 1–1.4μm spectral region, Electronics Letters, vol. 14, No. 11 (May 25, 1973).

T. Miki et al., Viabilities of the wavelength–division–multiplexing transmission system over an optical fiber cable, IEEE Transactions on Communications, vol. Com–26, No. 7 (Jul. 1978).

K. Aoyama et al., Optical demultiplexer for a wavelength division multiplexing system, Applied Optics, vol. 18, No. 8 (Apr. 15, 1979).

K. Aoyama et al., Low–loss optical demultiplexer for WDM system in the 0.8 μm wavelength region, Applied Optics, vol. 18, No. 16 (Aug. 15, 1979).

R. Watanabe et al., Optical Demultiplexer Using Concave Grating in 0.7–0.9 μm Wavelength Region, Electronics Letters, vol. 16, No. 3 (Jan. 31, 1980).

K. Kobayashi et al., Microoptic Grating Multiplexers and Optical Isolators for Fibers–Optic Communications, Journal of Quantum Electronics, vol. QE–16, No. 1 (Jan. 1980).

Y. Fujii et al., Optical Demultiplexer Using a Silison Echelette Grating, IEEE Journal of Quantum Electronics, vol. QE–16, No. 2 (Feb. 1980).

W. J. Tomlinson, Applications of GRIN–rod lenses in optical fiber communications systems, Applied Optics, vol. 19, No. 7 (Apr. 1, 1980).

A. Nicia, Wavelength Multiplexing and Demultiplexing Systems for Singlemode and Multimode Fibers, Conference Proceedings, European Conference on Optical Communication (Sep. 8–11, 1981).

B.D. Metcalf et al., High–capacity wavelength demultiplexing with a large–diameter GRIN rod lens, Applied Optics, vol. 21, No. 5 (Mar. 1, 1982).

J. Lipson et al., Low–Loss Wavelength Division Multiplexing (WDM) Devices for Single–Mode Systems, Journal of Lightwave Technology, vol. LT–1, No. 2 (Jun. 1983).

G. Winzer, Wavelength Multiplexing Components—A Review of Single–Mode Devices and their Applications, Journal of Lightwave Technology, vol. LT–2, No. 4 (Aug. 1984).

H. Ishio et al., Review and Status of Wavelength–Division–Multiplexing and Its Application, Journal of Lightwave Technology, vol. LT–2, No. 4 (Aug. 1984).

Y. Fujii et al., Optical Demultiplexer Utilizing an Ebert Mounting Silicon Grating, Journal of Lightwave Technology, vol. LT–2, No. 5 (Oct. 1984).

J. Lipson et al., A Four–Channel Lightwave Subsystem Using Wavelength Division Multiplexing, IEEE Journal of Lightwave Technology, vol. LT–3, No. 1 (Feb. 1985).

B. Hillerich et al., Wide Passband Grating Multiplexer for Multimode Fibers, Journal of Lightwave Technology, vol. LT–3, No. 3 (Jun. 1985).

J. Lipson et al., A Six–Channel Wavelength Multiplexer and Demultiplexer for Single Mode Systems, Journal of Lightwave Technology, vol. LT–3, No. 5 (Oct. 1985).

I. Nishi et al., Broad Passband Multi–Demultiplexer for Multimode Fibers Using a Diffraction Grating and Retroreflectors, Journal of Lightwave Technology, vol. LT–5, No. 12 (Dec. 1987).

B. Moslehi et al., Fiber–optic wavelength–division multiplexing and demultiplexing using volume holographic gratings, Optics Letters, vol. 14, No. 19 (Oct. 1, 1989).

Y. Huang et al., Wavelength–division–multiplexing and –demultiplexing by using a substrate–mode grating pair, Optics Letters, vol. 17, No. 22 (Nov. 15, 1992).

M. Wu et al., Design Considerations for Rowland Circle Grating Used in Photonic Integrated Devices for WDM Applications, Journal of Lightwave Technology, vol. 12, No. 11 (Nov. 1994).

A. Stavdas et al., Design of a holographic concave grating used as a multiplexer/demultiplexer in dense wavelength–routed optical networks with subnanometer channeling spacing, Journal of Modern Optics, vol. 42, No. 9, pp. 1863–1874 (Sep. 1995).

C. Zhou et al., Four Channel Multimode Wavelength Division Demultiplexer (WDM) System Based on Surface–normal Volume Holographic Gratings and Substrate–guided Waves, SPIE, vol. 3288.

A. Stavdas et al., Free–Space Aberration–Corrected Diffraction Grating Demultiplexer for Application in Densely–Spaced, Subnanometer Wavelength Routed Optical Networks, IEEE Electronics Letters, vol. 31, No. 16, pp. 1368–1370 (Aug. 1995).

D. Wisely, High performance 32 channel HDWDM multiplexer with lnm channels spacing and 0.7nm bandwidth, SPIE, vol. 1578, Fiber Networks for Telephony and CATV (1991).

A. Cohen et al., Active management of 100–GHz–spaced WDM channels, Optical Fiber Communication Conference and the International Conference on Integrated Optics and Optical Fiber Communication, Technical Digest, Conference Edition (Feb. 24, 1999).

B. Keyworth et al., Low Loss, Temperature Stable Differentiation Grating Wavelength (DE) Multiplexer, National Fiber Optic Engineers Conference, Technical Proceedings, vol. I (Sep. 13–17, 1998).

M. Seki et al., 20–Channel Micro–Optic Grating Demultiplexer for 1.1–1.6 $\mu$m Band Using a Small Focusing Parameter Graded–Index Rod Lens, Electronics Letters, vol. 18, No. 6, Mar. 18, 1982).

A. Koonen, A. Compact Wavelength Demultiplexer Using Both Interference Filters and A Diffraction Grating, European Conference on Optical Communication, Conference Proceedings (Sep. 8–11, 1981).

J. Conradi et al., Laser Based WDM Multichannel Video Transmission System, Electronics Letters, vol. 17, No. 2 (Jan. 22, 1981).

J. Laude et al., Wavelength division multiplexing/demultiplexing (WDM) using diffraction gratings, SPIE, vol. 503, Application, Theory, and Fabrication of Periodic Structures (1984).

A. Livanos et al., Chirped–grating demultiplexers in dielectric waveguides, Applied Physics Letters, vol. 30, No. 10 (May 1977).

H. Obara et al., Star Coupler Based WDM Switch Employing Tunable Devices With Reduced Tunability Range, Electronic Letters, vol. 28, No. 13 (Jun. 1992).

A. Willner et al., 2–D WDM Optical Interconnections Using Multiple–Wavelength VCSEL's for Simultaneous and Reconfigurable Communication Among Many Planes, IEEE Phoyonics Technology Letters, vol. 5, No. 7 (Jul. 1993).

M. Wang et al., Five Channel Polymer Waveguide Wavelength Division Demultiplexer for the Near Infrared, IEEE Photonics Technology Letters, vol. 3, No. 1 (Jan. 1991).

M. Li et al., Two–channel surface–normal wavelength–demultiplexer using substrate guided waves in conjunction with numtiplexed waveguide holograms, Appl. Phys. Lett., vol. 66, No. 3 (Jan. 1995).

J. Laude et al., Stimax, A Grating Multiplexer for Monomode or Multimode Fibers, Ninth European Conference on Optical Communications—ECOC83, Geneva, Switzerland (Oct. 23–26, 1983).

R. Watanabe et al., Optical Grating Multiplexer in the 1.1–1.5mm Wavelength Region, Electronics Letters, vol. 16, No. 3 (Jan. 31, 1980).

G.D. Khoe, New Integrated Subscriber Star Network Combining Maximum Versatility With Minimum Costs of Installation and Maintenance, European Conference on Optical Communication, Conference Proceedings, Copenhagen, Bella Center (Sep. 8–11, 1981).

T. Lingelsheim et al., Fabrication of micro–optical wavelength division multiplexer (WDM) gratings on glass using an ion etching technique, SPIE vol 503, Application, Theory, and Fabrication of Periodic Structures (1984).

D. Maystre et al., Optimization of wavelength demultiplexer in fiber optics using gold echelette gratings, SPIE vol. 503, Application, Theory, and Fabrication of Periodic Structures (1984).

D.R. Wisely, 32 Channel WDM Multiplexer with lnm Channel Spacing and 0.7 nm Bandwidth, Electronics Letters, vol. 27, No. 6, pp. 520–521 (Mar. 14, 1991).

C. Koeppen, et al., High Resolution Fiber Grating Optical Network Monitor, National Fiber Optic Engineers Conference, Technical Proceedings, vol. II (Sep. 13–17, 1998).

M.J. Cohen, et al. InGaAs photodiode arrays for DWDM monitoring and receiving, Lightwave, pp. 99–101 (Aug. 1999).

J.P. Laude, Wavelength Division Multiplexing, pp. 116–117, (1993).

Sami Hendow, et al., Performance Monitors Enable Remote Channel Management, Lightwave Special Reports, pp. 62–66 and 72 (Feb. 2000).

Adrian Meldrum, C– and L–band Channel Monitoring, Lightwave Special Reports, pp. 68–72 (Feb. 2000).

* cited by examiner

ULTRA-DENSE WAVELENGTH DIVISION MULTIPLEXING/DEMULTIPLEXING DEVICE

CROSS-REFERENCE TO RELATED APPLICATIONS

This patent application is a continuation-in-part application of U.S. patent application Ser. No. 09/257,045 now U.S. Pat. No. 6,137,933, filed Feb. 25, 1999; U.S. patent application Ser. No. 09/323,094, now U.S. Pat. No. 6,137,933 filed Jun. 1, 1999; U.S. patent application Ser. No. 09/342,142, filed Jun. 29, 1999; U.S. patent application Ser. No. 09/382,492, filed Aug. 25, 1999; U.S. patent application Ser. No. 09/382,624 now U.S. Pat. No. 6,271,970, filed Aug. 25, 1999; U.S. patent application Ser. No. 09/363,041 now U.S. Pat. No. 6,243,513, filed Jul. 29, 1999; U.S. patent application Ser. No. 09/363,042 now U.S. Pat. No. 6,236,780, filed Jul. 29, 1999; U.S. Patent application Ser. No. 09/392,670, filed Sep. 8, 1999; and U.S. patent application Ser. No. 09/392,831 now U.S. Pat. No. 6,181,852, filed Sep. 8, 1999; all of which are hereby incorporated herein by reference.

FIELD OF THE INVENTION

The present invention relates generally to wavelength division multiplexing and demultiplexing and, more particularly, to ultra-dense wavelength division multiplexing/demultiplexing devices.

BACKGROUND OF THE INVENTION

Wavelength division multiplexing (WDM) is a rapidly emerging technology that enables a very significant increase in the aggregate volume of data that can be transmitted over optical fibers. Prior to the use of WDM, most optical fibers were used to unidirectionally carry only a single data channel at one wavelength. The basic concept of WDM is to launch and retrieve multiple data channels in and out, respectively, of an optical fiber. Each data channel is transmitted at a unique wavelength, and the wavelengths are appropriately selected such that the channels do not interfere with each other, and the optical transmission losses of the fiber are low. Today, commercial WDM systems exist that allow for the transmission of 2 to 100 simultaneous data channels.

WDM is a cost-effective method of increasing the volume of data (commonly termed bandwidth) transferred over optical fibers. Alternate competing technologies for increasing bandwidth include the burying of additional fiber optic cable or increasing the optical transmission rate over optical fiber. The burying of additional fiber optic cable is quite costly as it is presently on the order of $15,000 to $40,000 per kilometer. Increasing the optical transmission rate is limited by the speed and economy of the electronics surrounding the fiber optic system. One of the primary strategies for electronically increasing bandwidth has been to use time division multiplexing (TDM), which groups or multiplexes multiple lower rate electronic data channels together into a single very high rate channel. This technology has for the past 20 years been very effective for increasing bandwidth. However, it is now increasingly difficult to improve transmission speeds, both from a technological and an economical standpoint. WDM offers the potential of both an economical and technological solution to increasing bandwidth by using many parallel channels. Further, WDM is complimentary to TDM. That is, WDM can allow many simultaneous high transmission rate TDM channels to be passed over a single optical fiber.

The use of WDM to increase bandwidth requires two basic devices that are conceptually symmetrical. The first device is a wavelength division multiplexer. This device takes multiple beams, each with discrete wavelengths that are initially spatially separated in space, and provides a means for spatially combining all of the different wavelength beams into a single polychromatic beam suitable for launching into an optical fiber. The multiplexer may be a completely passive optical device or may include electronics that control or monitor the performance of the multiplexer. The input to the multiplexer is typically accomplished with optical fibers, although laser diodes or other optical sources may also be employed. As mentioned above, the output from the multiplexer is a single polychromatic beam which is typically directed into an optical fiber.

The second device for WDM is a wavelength division demultiplexer. This device is functionally the opposite of the wavelength division multiplexer. That is, the wavelength division demultiplexer receives a polychromatic beam from an optical fiber and provides a means of spatially separating the different wavelengths of the polychromatic beam. The output from the demultiplexer is a plurality of monochromatic beams which are typically directed into a corresponding plurality of optical fibers or photodetectors.

To date, most WDM devices have been directed toward multiplexing or demultiplexing a standard number of data channels. For example, many WDM devices are specifically manufactured to multiplex 33 individual data channels being carried on 33 corresponding monochromatic beams into a single polychromatic beam carrying all 33 data channels, or to demultiplex a single polychromatic beam carrying 33 separate data channels into 33 individual monochromatic beams each carrying a corresponding data channel. These WDM devices are typically limited to 33 data channels due to the manner in which they have been manufactured and the technologies employed to perform the multiplexing and demultiplexing functions therein. For example, WDM devices employing fiber Bragg gratings and/or array waveguide gratings to perform multiplexing and demultiplexing functions are typically limited to the number of data channels that the WDM devices were specifically manufactured to handle. Thus, if additional numbers of data channels need to be multiplexed and/or demultiplexed, additional WDM devices are required, at a corresponding additional cost. Alternatively, enhanced WDM devices employing these technologies may be designed to accommodate additional numbers of data channels, but with corresponding additional design, manufacturing, and testing costs. Also, such enhanced WDM devices are typically larger in size so as to accommodate the increased number of data channels, thereby requiring more space to operate, which usually translates into additional packaging costs.

In view of the foregoing, it would be desirable to provide a WDM device which overcomes the above-described inadequacies and shortcomings. More particularly, it would be desirable to provide an ultra-dense WDM device which can accommodate additional data channels without requiring additional WDM devices or significant design modifications.

OBJECTS OF THE INVENTION

The primary object of the present invention is to provide ultra-dense wavelength division multiplexing/demultiplexing devices.

The above-stated primary object, as well as other objects, features, and advantages, of the present invention will become readily apparent from the following summary and detailed descriptions, which are to be read in conjunction with the appended drawings.

SUMMARY OF THE INVENTION

According to the present invention, ultra-dense wavelength division multiplexing/demultiplexing devices are provided. In the case of an ultra-dense wavelength division multiplexing device, a wavelength division multiplexing device is used for combining at least one plurality of monochromatic optical beams into a corresponding at least one single, multiplexed, polychromatic optical beam, wherein the wavelength division multiplexing device has an input element and an output element. A plurality of optical input devices is disposed proximate the input element, wherein each of the plurality of optical input devices communicates a plurality of monochromatic optical beams to the wavelength division multiplexing device for combining the plurality of monochromatic optical beams into a single, multiplexed, polychromatic optical beam. A corresponding plurality of optical output devices is disposed proximate the output element, wherein each of the plurality of optical output devices receives a corresponding single, multiplexed, polychromatic optical beam.

In accordance with other aspects of the present invention, the wavelength division multiplexing device comprises a diffraction grating for combining the at least one plurality of monochromatic optical beams into the corresponding at least one single, multiplexed, polychromatic optical beam. The diffraction grating is preferably a reflective diffraction grating oriented at the Littrow diffraction angle. Alternatively, the diffraction grating can be a transmissive diffraction grating.

In accordance with further aspects of the present invention, the input element can beneficially be one of several items such as, for example, a collimating lens or a boot lens. Similarly, the output element can beneficially be one of several items such as, for example, a focusing lens or a boot lens.

In accordance with still further aspects of the present invention, the plurality of optical input devices is beneficially a plurality of input fiber coupling devices, wherein each of the plurality of input fiber coupling devices is arranged into an array of optical fibers, and each of the optical fibers transmits a monochromatic optical beam to the wavelength division multiplexing device. Also, the plurality of optical input devices is beneficially a plurality of laser diode coupling devices, wherein each of the plurality of laser diode coupling devices is arranged into an array of laser diodes, and each of the laser diodes transmits a monochromatic optical beam to the wavelength division multiplexing device. Further, the plurality of optical output devices is beneficially a plurality of output fiber coupling devices, wherein each of the plurality of output fiber coupling devices maintains at least one optical fiber, and each optical fiber receives a single, multiplexed, polychromatic optical beam from the wavelength division multiplexing device.

In the case of an ultra-dense wavelength division demultiplexing device, a wavelength division demultiplexing device is used for separating at least one multiplexed, polychromatic optical beam into a corresponding at least one plurality of monochromatic optical beams, wherein the wavelength division demultiplexing device has an input element and an output element. A plurality of optical input devices is disposed proximate the input element, wherein each of the plurality of optical input devices communicates a single, multiplexed, polychromatic optical beam to the wavelength division demultiplexing device for separating the single, multiplexed, polychromatic optical beam into a plurality of monochromatic optical beams. A corresponding plurality of optical output devices is disposed proximate the output element, wherein each of the plurality of optical output devices receives a corresponding plurality of monochromatic optical beams.

In accordance with other aspects of the present invention, the wavelength division demultiplexing device comprises a diffraction grating for separating the at least one multiplexed, polychromatic optical beam into the corresponding at least one plurality of monochromatic optical beams. The diffraction grating is preferably a reflective diffraction grating oriented at the Littrow diffraction angle. Alternatively, the diffraction grating can be a transmissive diffraction grating.

In accordance with further aspects of the present invention, the input element can beneficially be one of several items such as, for example, a collimating lens or a boot lens. Similarly, the output element can beneficially be one of several items such as, for example, a focusing lens or a boot lens.

In accordance with still further aspects of the present invention, the plurality of optical input devices is beneficially a plurality of input fiber coupling devices, wherein each of the plurality of input fiber coupling devices maintains at least one optical fiber, and each optical fiber transmits a single, multiplexed, polychromatic optical beam to the wavelength division demultiplexing device. Also, the plurality of optical output devices is beneficially a plurality of output fiber coupling devices, wherein each of the plurality of output fiber coupling devices is arranged into an array of optical fibers, and each of the optical fibers receives a monochromatic optical beam from the wavelength division demultiplexing device. Further, the plurality of optical output devices is beneficially a plurality of photodetector coupling devices, wherein each of the plurality of photodetector coupling devices is arranged into an array of photodetectors, and each of the photodetectors receives a monochromatic optical beam from the wavelength division demultiplexing device.

In accordance with still further aspects of the present invention, the at least one multiplexed, polychromatic optical beam can be at least two multiplexed, polychromatic optical beams. If such is the case, the ultra-dense wavelength division demultiplexing device may further comprise a splitter for splitting a single, pre-split, multiplexed, polychromatic optical beam into the at least two multiplexed, polychromatic optical beams. The single, pre-split, multiplexed, polychromatic optical beam can be split equally or unequally. Also, the single, pre-split, multiplexed, polychromatic optical beam can be split in several manners such as, for example, according to beam wavelengths or according to beam intensity.

The present invention also encompasses a method for increasing channel throughput in a wavelength division demultiplexing device. The method comprises splitting a single, multiplexed, polychromatic optical beam into at least two multiplexed, polychromatic optical beams, and then simultaneously separating each of the at least two multiplexed, polychromatic optical beams into a corresponding at least two pluralities of monochromatic optical beams. The method also preferably comprises collimating each of the at least two multiplexed, polychromatic optical beams, and focusing the corresponding at least two pluralities of monochromatic optical beams.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 1b is a top view of the ultra-dense wavelength division multiplexing device shown in FIG. 1a.

FIG. 1c is an end view of a portion of the ultra-dense wavelength division multiplexing device shown in FIG. 1a.

FIG. 2a is a perspective view of a coupling device containing a plurality of laser diodes for replacing the plurality of optical input fibers in the multiplexing device shown in FIG. 1a.

FIG. 2b is a perspective view of a coupling device containing a plurality of photodetectors for replacing the plurality of optical input fibers in the demultiplexing device shown in FIG. 3a.

FIG. 3b is a top view of the ultra-dense wavelength division demultiplexing device shown in FIG. 3a.

DETAILED DESCRIPTION OF PREFERRED EMBODIMENTS

Figure 1A:
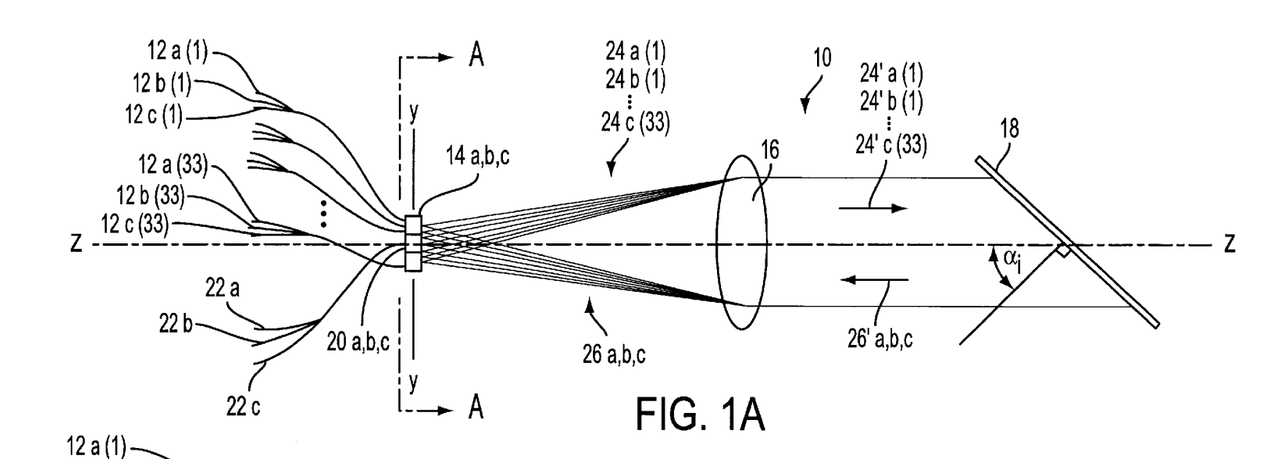
FIG. 1a is a side view of an ultra-dense wavelength division multiplexing device having a plurality of optical input devices and a plurality of optical output devices in accordance with the present invention.
Figure 1B:
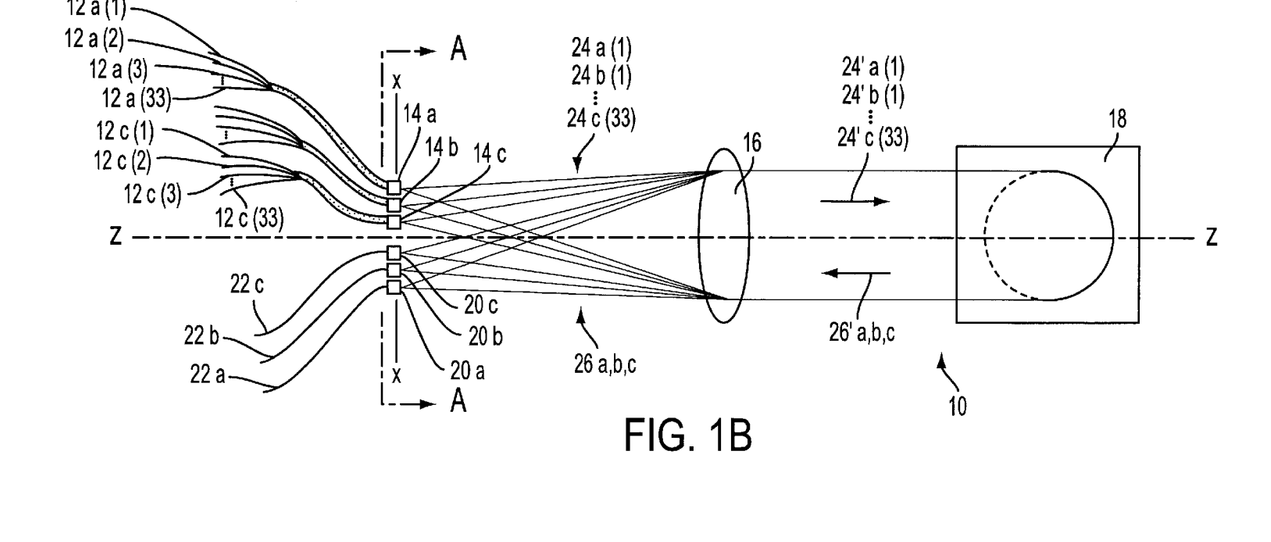

Referring to FIGS. 1a and 1b, there are shown a side view and a top view, respectively, of a preferred embodiment of an ultra-dense wavelength division multiplexing/demultiplexing device 10 in accordance with the present invention. The multiplexing device 10 comprises a plurality of optical input fibers 12, a plurality of input fiber coupling devices 14, a collimating/focusing lens 16, a reflective diffraction grating 18, a plurality of output fiber coupling devices 20, and a plurality of optical output fibers 22. All of the above-identified components of the multiplexing device 10 are disposed along an optical axis Z—Z of the multiplexing device 10, as will be described in more detail below.

At this point it should be noted that the optical input fibers 12 and the optical output fibers 22, as well as any other optical fibers described herein as being used in conjunction with WDM devices in accordance with the present invention, are single mode optical fibers. Of course, however, this does not limit the present invention WDM devices to use with only single mode optical fibers. For example, the present invention WDM devices can also be used with multimode optical fibers.

Figure 1C:
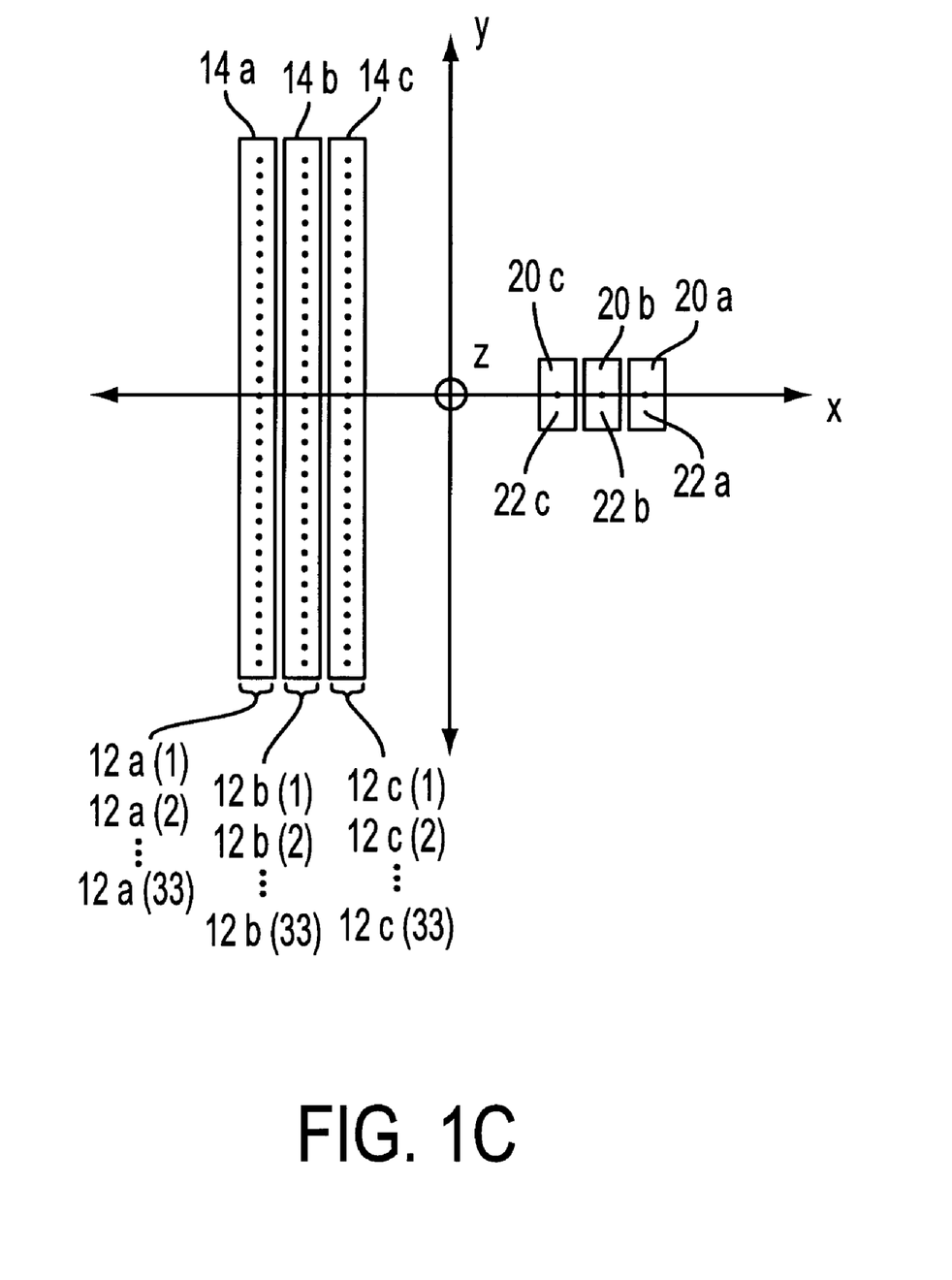

The plurality of optical input fibers 12 are grouped into three one-dimensional input fiber arrays (i.e., three 1×33 arrays) by the plurality of input fiber coupling devices 14, while each of the plurality of optical output fibers 22 is secured to a corresponding one of the plurality of output fiber coupling devices 20. Both the input fiber coupling devices 14 and the output fiber coupling devices 20 are used for purposes of ease of optical fiber handling and precision placement, and can be formed of, for example, silicon V-groove assemblies. Referring to FIG. 1c, there is shown an end view of the plurality of input fiber coupling devices 14 and the plurality of output fiber coupling devices 20, along section A—A of FIGS. 1a and 1b. Each of the plurality of input fiber coupling devices 14 is arranged as a 1×33 array for precisely and securely positioning thirty-three of the plurality of optical input fibers 12, while each of the plurality of output fiber coupling devices 20 precisely and securely positions a corresponding one of the plurality of optical output fibers 22.

Returning to FIGS. 1a and 1b, each of the plurality of optical input fibers 12 transmits a single, monochromatic optical input beam 24, while each of the plurality of optical output fibers 22 receives a single, multiplexed, polychromatic optical output beam 26. Each of the monochromatic optical input beams 24 being transmitted from the plurality of optical input fibers 12 is carrying a single channel of data at a unique wavelength, which is preferably, but not required to be, within the infrared (IR) region of the electromagnetic spectrum. The single channel of data that is being carried by each monochromatic optical input beam 24 is superimposed on each corresponding unique wavelength by means (e.g., laser diodes connected to the plurality of optical input fibers 12), which are not shown here and which do not form a part of this invention, but are well known in the art. The unique wavelengths of the monochromatic optical input beams 24 are appropriately preselected such that the data channels do not interfere with each other (i.e., there is sufficient channel spacing), and the optical transmission losses through both the optical input fibers 12 and the optical output fibers 22 are low, as is also well known in the art.

Each of the multiplexed, polychromatic optical output beams 26 being received by the plurality of optical output fibers 22 is carrying a plurality of channels of data at the unique wavelengths of corresponding ones of the plurality of monochromatic optical input beams 24. That is, a first of the multiplexed, polychromatic optical output beams 26a is carrying a plurality of channels of data (e.g., 33 channels of data) at the unique wavelengths of the monochromatic optical input beams 24a that are transmitted from the optical input fibers 12a being precisely and securely positioned by a first of the plurality of input fiber coupling devices 14a. Similarly, a second of the multiplexed, polychromatic optical output beams 26b is carrying a plurality of channels of data (e.g., 33 channels of data) at the unique wavelengths of the monochromatic optical input beams 24b that are transmitted from the optical input fibers 12b being precisely and securely positioned by a second of the plurality of input fiber coupling devices 14b. Similarly still, a third of the multiplexed, polychromatic optical output beams 26c is carrying a plurality of channels of data (e.g., 33 channels of data) at the unique wavelengths of the monochromatic optical input beams 24c that are transmitted from the optical input fibers 12c being precisely and securely positioned by a third of the plurality of input fiber coupling devices 14c.

The plurality of monochromatic optical input beams 24a are combined into the multiplexed, polychromatic optical output beam 26a through the combined operation of the collimating/focusing lens 16 and the reflective diffraction grating 18, as will be described in more detail below. Similarly, the plurality of monochromatic optical input beams 24b are combined into the multiplexed, polychromatic optical output beam 26b through the combined operation of the collimating/focusing lens 16 and the reflective diffraction grating 18, as will be described in more detail below. Similarly still, the plurality of monochromatic optical input beams 24c are combined into the multiplexed, polychromatic optical output beam 26c through the combined operation of the collimating/focusing lens 16 and the reflective diffraction grating 18, as will be described in more detail below.

At this point it should be noted that the input fiber coupling device 14a and the output fiber coupling device 20a are disposed offset from, but symmetrically about, the optical axis Z—Z of the multiplexing device 10 so as to insure that the multiplexed, polychromatic optical output beam 26a is directed to the optical output fiber 22a secured to the output fiber coupling device 20a, and not to any of the other optical output fibers 22, or anywhere else. This offset spacing of the input fiber coupling device 14a and the output fiber coupling device 20a is determined based upon the focusing power of the collimating/focusing lens 16, as well as the characteristics of the diffraction grating 18 and the wavelengths of each of the monochromatic optical input beams 24a.

Similarly, the input fiber coupling device 14b and the output fiber coupling device 20b are disposed offset from, but symmetrically about, the optical axis Z—Z of the multiplexing device 10 so as to insure that the multiplexed, polychromatic optical output beam 26b is directed to the optical output fiber 22b secured to the output fiber coupling device 20b, and not to any of the other optical output fibers 22, or anywhere else. This offset spacing of the input fiber coupling device 14b and the output fiber coupling device 20b is determined based upon the focusing power of the collimating/focusing lens 16, as well as the characteristics of the diffraction grating 18 and the wavelengths of each of the monochromatic optical input beams 24b.

Similarly still, the input fiber coupling device 14c and the output fiber coupling device 20c are disposed offset from, but symmetrically about, the optical axis Z—Z of the multiplexing device 10 so as to insure that the multiplexed, polychromatic optical output beam 26c is directed to the optical output fiber 22c secured to the output fiber coupling device 20c, and not to any of the other optical output fibers 22, or anywhere else. This offset spacing of the input fiber coupling device 14c and the output fiber coupling device 20c is determined based upon the focusing power of the collimating/focusing lens 16, as well as the characteristics of the diffraction grating 18 and the wavelengths of each of the monochromatic optical input beams 24c.

Each of the plurality of monochromatic optical input beams 24 are transmitted from their corresponding optical input fiber 12 into the air space between the plurality of input fiber coupling devices 14 and the collimating/focusing lens 16. Within this air space, the plurality of monochromatic optical input beams 24 are expanded in diameter until they become incident upon the collimating/focusing lens 16. The collimating/focusing lens 16 collimates each of the plurality of monochromatic optical input beams 24, and then transmits each collimated, monochromatic optical input beam 24' to the reflective diffraction grating 18.

At this point it should be noted that the optical axis of the collimating/focusing lens 16 coincides with the optical axis Z—Z of the multiplexing device 10 so as to insure that the multiplexed, polychromatic optical output beam 26a is directed to the optical output fiber 22a secured to the output fiber coupling device 20a, and not to any of the other optical output fibers 22, or anywhere else, as will be described in more detail below. Similarly, the optical axis of the collimating/focusing lens 16 coincides with the optical axis Z—Z of the multiplexing device 10 so as to insure that the multiplexed, polychromatic optical output beam 26b is directed to the optical output fiber 22b secured to the output fiber coupling device 20b, and not to any of the other optical output fibers 22, or anywhere else, as will be described in more detail below. Similarly still, the optical axis of the collimating/focusing lens 16 coincides with the optical axis Z—Z of the multiplexing device 10 so as to insure that the multiplexed, polychromatic optical output beam 26c is directed to the optical output fiber 22c secured to the output fiber coupling device 20c, and not to any of the other optical output fibers 22, or anywhere else, as will be described in more detail below.

The reflective diffraction grating 18 operates to angularly disperse the plurality of collimated, monochromatic optical input beams 24' by an amount that is dependent upon the wavelength of each of the plurality of collimated, monochromatic optical input beams 24'. Also, the reflective diffraction grating 18 is oriented at a special angle (i.e., the Littrow diffraction angle, $\alpha_i$) relative to the optical axis Z—Z of the multiplexing device 10 in order to obtain the Littrow diffraction condition for an optical beam having a wavelength that lies within or near the wavelength range of the plurality of collimated, monochromatic optical input beams 24'. The Littrow diffraction condition requires that an optical beam be incident on and reflected back from a reflective diffraction grating at the exact same angle. Therefore, it will be readily apparent to one skilled in the art that the reflective diffraction grating 18 is used to obtain near-Littrow diffraction for each of the plurality of collimated, monochromatic optical input beams 24'.

The Littrow diffraction angle, $\alpha_i$, is determined by the well-known diffraction grating equation, $$m\lambda = 2d(\sin \alpha_i)$$

wherein m is the diffraction order, $\lambda$ is the wavelength, d is the diffraction grating groove spacing, and $\alpha_i$ is the common angle of incidence and reflection. It will be readily apparent to one skilled in the art that the Littrow diffraction angle, $\alpha_i$, depends upon numerous variables, which may be varied as necessary to optimize the performance of the multiplexing device 10. For example, variables affecting the Littrow diffraction angle, $\alpha_i$, include the desired grating diffraction order, the grating blaze angle, the number of data channels, the spacing of the data channels, and the wavelength range of the multiplexing device 10.

At this point it should be noted that the reflective diffraction grating 18 can be formed from a variety of materials and by a variety of techniques. For example, the reflective diffraction grating 18 can be formed by a three-dimensional hologram in a polymer medium, or by replicating a mechanically ruled master with a polymer material. In both cases, the polymer is overcoated with a thin, highly reflective metal layer such as, for example, gold or aluminum. Alternatively, the reflective diffraction grating 18 can be formed by chemically etching into a planar material such as, for example, glass or silicon, which is also overcoated with a thin, highly reflective metal layer such as, for example, gold or aluminum.

As previously mentioned, the reflective diffraction grating 18 operates to angularly disperse the plurality of collimated, monochromatic optical input beams 24'. Thus, the reflective diffraction grating 18 removes the angular separation of the plurality of collimated, monochromatic optical input beams 24'a, and reflects a collimated, polychromatic optical output beam 26'a back towards the collimating/focusing lens 16. The collimated, polychromatic optical output beam 26'a contains each of the unique wavelengths of the plurality of collimated, monochromatic optical input beams 24'a. Thus, the collimated, polychromatic optical output beam 26'a is a collimated, multiplexed, polychromatic optical output beam 26'a. The collimating/focusing lens 16 focuses the collimated, multiplexed, polychromatic optical output beam 26'a, and then transmits the resulting multiplexed, polychromatic optical output beam 26a to the output fiber coupling device 20a where it becomes incident upon the optical output fiber 22a. The multiplexed, polychromatic optical output beam 26a is then coupled into the optical output fiber 22a for transmission therethrough.

Similarly, the reflective diffraction grating 18 removes the angular separation of the plurality of collimated, monochromatic optical input beams 24'b, and reflects a collimated, polychromatic optical output beam 26'b back towards the collimating/focusing lens 16. The collimated, polychromatic optical output beam 26'b contains each of the unique wavelengths of the plurality of collimated, monochromatic optical input beams 24'b. Thus, the collimated, polychromatic optical output beam 26'b is a collimated, multiplexed, polychromatic optical output beam 26'b. The collimating/ focusing lens 16 focuses the collimated, multiplexed, polychromatic optical output beam 26'b, and then transmits the resulting multiplexed, polychromatic optical output beam 26b to the output fiber coupling device 20b where it becomes incident upon the optical output fiber 22b. The multiplexed, polychromatic optical output beam 26b is then coupled into the optical output fiber 22ba for transmission therethrough.

Similarly still, the reflective diffraction grating 18 removes the angular separation of the plurality of collimated, monochromatic optical input beams 24'c, and reflects a collimated, polychromatic optical output beam 26'c back towards the collimating/focusing lens 16. The collimated, polychromatic optical output beam 26'c contains each of the unique wavelengths of the plurality of collimated, monochromatic optical input beams 24'c. Thus, the collimated, polychromatic optical output beam 26'c is a collimated, multiplexed, polychromatic optical output beam 26'c. The collimating/focusing lens 16 focuses the collimated, multiplexed, polychromatic optical output beam 26'c, and then transmits the resulting multiplexed, polychromatic optical output beam 26c to the output fiber coupling device 20c where it becomes incident upon the optical output fiber 22c. The multiplexed, polychromatic optical output beam 26c is then coupled into the optical output fiber 22c for transmission therethrough.

Figure 2A:
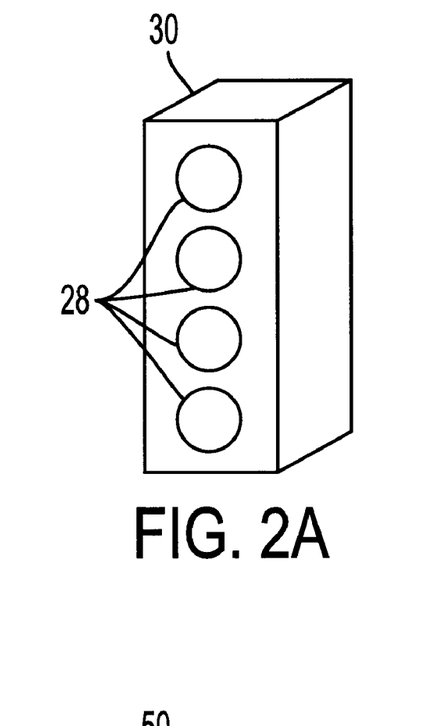

At this point it should be noted that the plurality of optical input fibers 12 could be replaced in the multiplexing device 10 by a corresponding plurality of laser diodes 28 secured within a plurality of coupling devices 30, such as shown in FIG. 2a (although FIG. 2a shows only a single 1×4 array). The coupling device 30 performs a similar function to that of each of the plurality of input fiber coupling devices 14, that being to precisely group the plurality of laser diodes 28 into a one-dimensional input array. The plurality of laser diodes 28 are used in place of the plurality of optical input fibers 12 to transmit the plurality of monochromatic optical input beams 24 to the multiplexing device 10. The array of laser diodes 28, as well as the plurality of optical input fibers 12, may operate alone, or may be used with appropriate focusing lenses (not shown) to provide the best coupling and the lowest amount of signal loss and channel crosstalk.

Figure 3A:
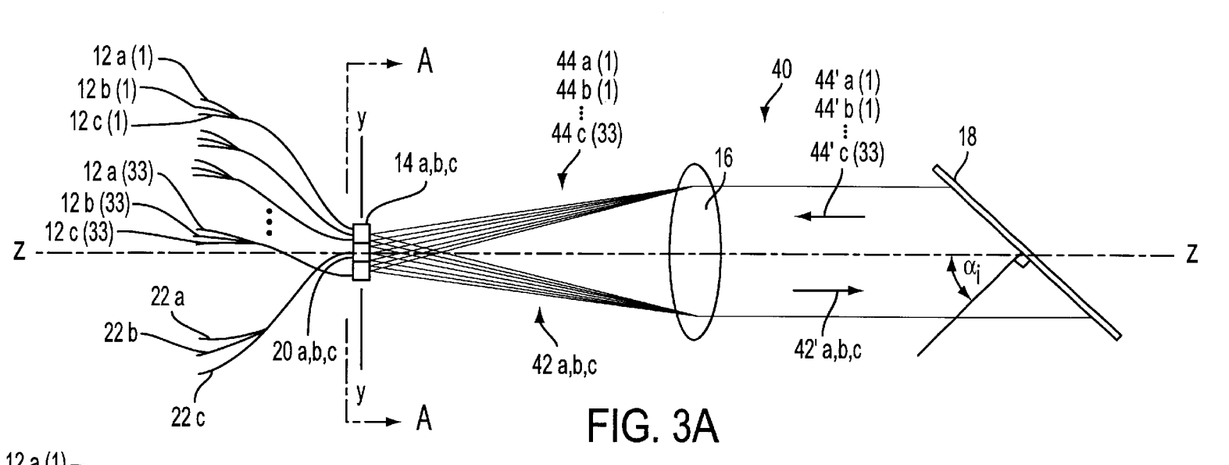
FIG. 3a is a side view of an ultra-dense wavelength division demultiplexing device having a plurality of optical input devices and a plurality of optical output devices in accordance with the present invention.
Figure 3B:
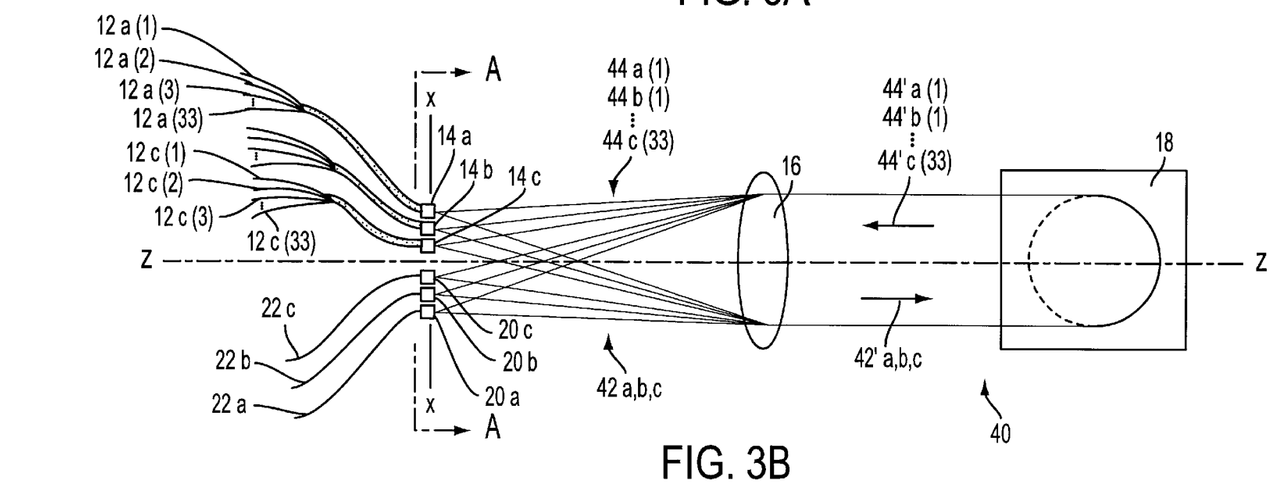

At this point it should be noted that the multiplexing device 10, as well as all of the multiplexing devices described herein, may be operated in a converse configuration as a demultiplexing device 40, such as shown in FIGS. 3a and 3b. The demultiplexing device 40 is physically identical to the multiplexing device 10, and is therefore numerically identified as such. However, the demultiplexing device 40 is functionally opposite to the multiplexing device 10. That is, a plurality of multiplexed, polychromatic optical input beams 42 are transmitted from the plurality of optical fibers 22, and a plurality of monochromatic optical output beams 44 are transmitted to the plurality of optical fibers 12, wherein each one of the plurality of monochromatic optical output beams 44 is transmitted to a corresponding one of the plurality of optical fibers 12. For example, the multiplexed, polychromatic optical input beam 42a is simultaneously carrying a plurality of channels of data, each at a unique wavelength which is preferably, but not required to be, within the infrared (IR) region of the electromagnetic spectrum. The plurality of monochromatic optical output beams 44a are each carrying a single channel of data at a corresponding one of the unique wavelengths of the multiplexed, polychromatic optical input beam 42a. The multiplexed, polychromatic optical input beam 42a is separated into the plurality of monochromatic optical output beams 44a through the combined operation of the collimating/focusing lens 16 and the reflective diffraction grating 18. Thus, the collimating/focusing lens 16 and the reflective diffraction grating 18 operate to perform a demultiplexing function.

Similarly, the multiplexed, polychromatic optical input beam 42b is simultaneously carrying a plurality of channels of data, each at a unique wavelength which is preferably, but not required to be, within the infrared (IR) region of the electromagnetic spectrum. The plurality of monochromatic optical output beams 44b are each carrying a single channel of data at a corresponding one of the unique wavelengths of the multiplexed, polychromatic optical input beam 42b. The multiplexed, polychromatic optical input beam 42b is separated into the plurality of monochromatic optical output beams 44b through the combined operation of the collimating/focusing lens 16 and the reflective diffraction grating 18. Thus, the collimating/focusing lens 16 and the reflective diffraction grating 18 operate to perform a demultiplexing function.

Similarly still, the multiplexed, polychromatic optical input beam 42c is simultaneously carrying a plurality of channels of data, each at a unique wavelength which is preferably, but not required to be, within the infrared (IR) region of the electromagnetic spectrum. The plurality of monochromatic optical output beams 44c are each carrying a single channel of data at a corresponding one of the unique wavelengths of the multiplexed, polychromatic optical input beam 42c. The multiplexed, polychromatic optical input beam 42c is separated into the plurality of monochromatic optical output beams 44c through the combined operation of the collimating/focusing lens 16 and the reflective diffraction grating 18. Thus, the collimating/focusing lens 16 and the reflective diffraction grating 18 operate to perform a demultiplexing function.

Figure 2B:
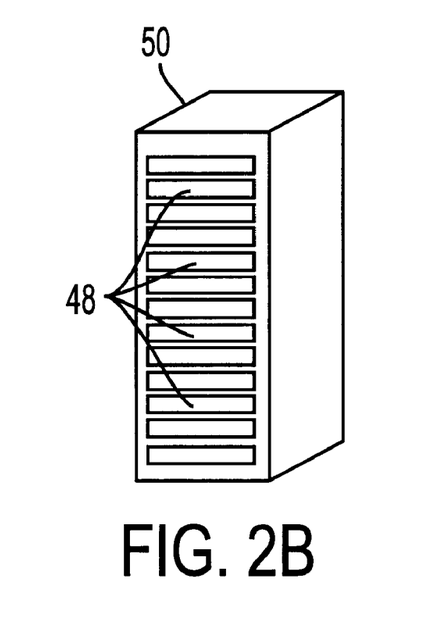

At this point it should be noted that the plurality of optical fibers 12 could be replaced in the demultiplexing device 40 by a corresponding plurality of photodetectors 48 secured within a plurality of coupling devices 50, such as shown in FIG. 2b (although FIG. 2b shows only a single 1×3 array). The coupling device 50 performs a similar function to that of each of the plurality of fiber coupling devices 14, that being to precisely group the plurality of photodetectors 48 into a one-dimensional input array. The plurality of photodetectors 48 are used in place of the plurality of optical fibers 12 to receive the plurality of monochromatic optical output beams 44 from the demultiplexing device 40. The array of photodetectors 48, as well as the plurality of optical fibers 12, may operate alone, or may be used with appropriate focusing lenses (not shown) to provide the best coupling and the lowest amount of signal loss and channel crosstalk.

Figure 4:
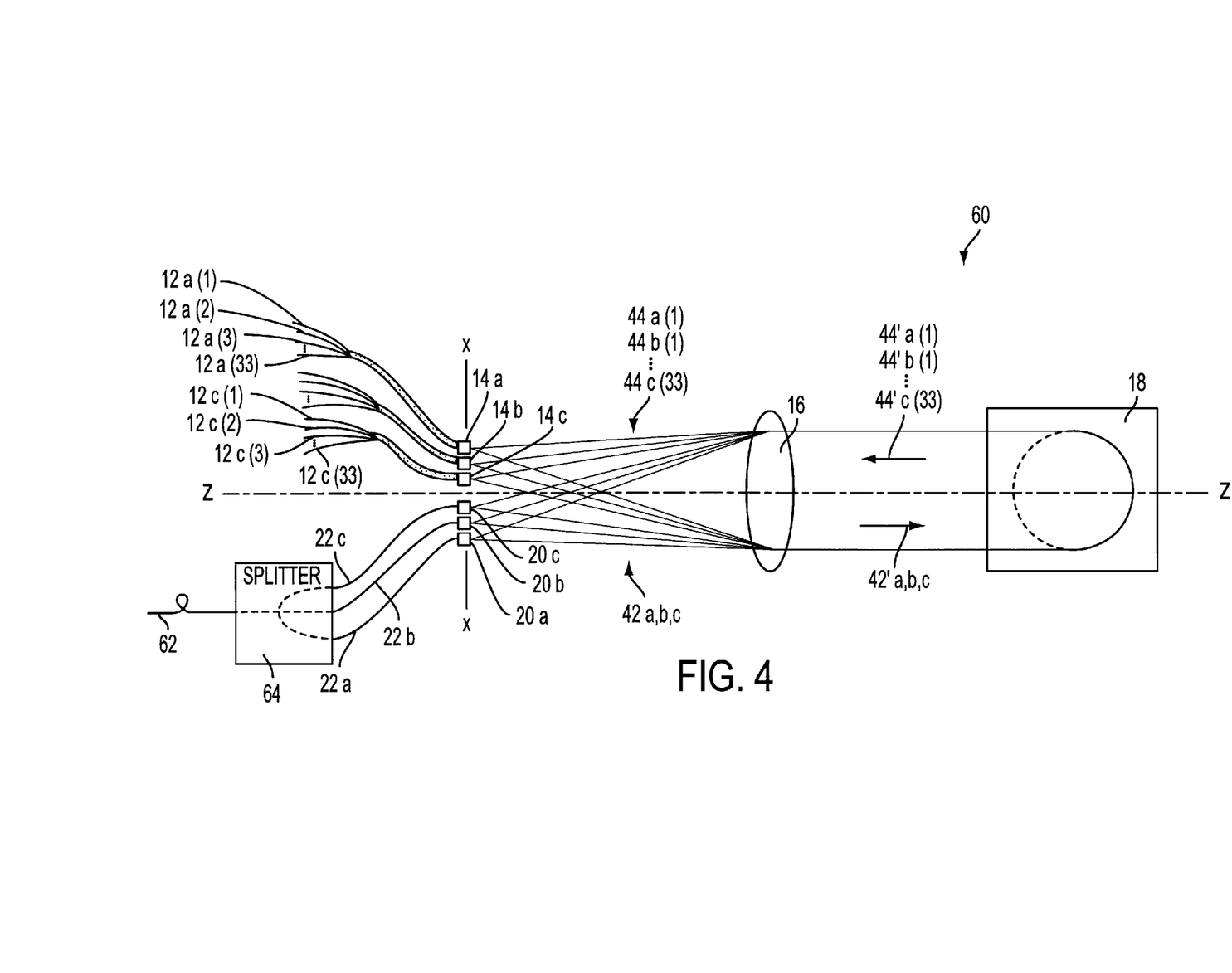
FIG. 4 is a top view of a demultiplexing system employing an ultra-dense wavelength division demultiplexing device having a plurality of optical input devices and a plurality of optical output devices in accordance with the present invention.

Referring to FIG. 4, there is shown a demultiplexing system 60 wherein the demultiplexing device 40 of FIGS. 3a and 3b is used in a practical manner to demultiplex additional data channels without requiring additional WDM devices or significant design modifications in accordance with the present invention. The demultiplexing system 60 is physically identical to the multiplexing device 40, except for the addition of optical input fiber 62 and optical filter 64, and is therefore numerically identified as such. The optical input fiber 62 communicates a single, multiplexed, polychromatic optical input beam to the optical filter 64. The single, multiplexed, polychromatic optical input beam being communicated by the optical input fiber 62 is simultaneously carrying a plurality of channels of data (e.g., 99 channels of data), each at a unique wavelength which is preferably, but not required to be, within the infrared (IR) region of the electromagnetic spectrum. The optical filter 64 equally splits the single, multiplexed, polychromatic optical input beam according to wavelength into three multiplexed, polychromatic optical input beams 42. That is, each of the three resulting multiplexed, polychromatic optical input beams 42 is simultaneously carrying a plurality of channels of data (e.g., 33 channels of data) at the unique wavelengths of corresponding ones of the unique wavelengths of the single, multiplexed, polychromatic optical input beam. For example, the multiplexed, polychromatic optical input beam 42a is simultaneously carrying a plurality of channels of data (e.g., 33 channels of data) at the unique wavelengths of corresponding ones of the unique wavelengths of the single, multiplexed, polychromatic optical input beam. Then, the plurality of monochromatic optical output beams 44a are each carrying a single channel of data at a corresponding one of the unique wavelengths of the multiplexed, polychromatic optical input beam 42a. The multiplexed, polychromatic optical input beam 42a is separated into the plurality of monochromatic optical output beams 44a through the combined operation of the collimating/focusing lens 16 and the reflective diffraction grating 18. Thus, the collimating/focusing lens 16 and the reflective diffraction grating 18 operate to perform a demultiplexing function.

Similarly, the multiplexed, polychromatic optical input beam 42b is simultaneously carrying a plurality of channels of data (e.g., 33 channels of data) at the unique wavelengths of corresponding ones of the unique wavelengths of the single, multiplexed, polychromatic optical input beam. Then, the plurality of monochromatic optical output beams 44b are each carrying a single channel of data at a corresponding one of the unique wavelengths of the multiplexed, polychromatic optical input beam 42b. The multiplexed, polychromatic optical input beam 42b is separated into the plurality of monochromatic optical output beams 44b through the combined operation of the collimating/focusing lens 16 and the reflective diffraction grating 18. Thus, the collimating/focusing lens 16 and the reflective diffraction grating 18 operate to perform a demultiplexing function.

Similarly still, the multiplexed, polychromatic optical input beam 42c is simultaneously carrying a plurality of channels of data (e.g., 33 channels of data) at the unique wavelengths of corresponding ones of the unique wavelengths of the single, multiplexed, polychromatic optical input beam. Then, the plurality of monochromatic optical output beams 44c are each carrying a single channel of data at a corresponding one of the unique wavelengths of the multiplexed, polychromatic optical input beam 42c. The multiplexed, polychromatic optical input beam 42c is separated into the plurality of monochromatic optical output beams 44c through the combined operation of the collimating/focusing lens 16 and the reflective diffraction grating 18. Thus, the collimating/focusing lens 16 and the reflective diffraction grating 18 operate to perform a demultiplexing function.

At this point it should be noted that there are many alternate embodiments and uses for the present invention ultra-dense wavelength division multiplexing/demultiplexing device. For example, the single, multiplexed, polychromatic optical input beam could be split unequally according to wavelength. Alternatively, the single, multiplexed, polychromatic optical input beam could be split either equally or unequally according to beam intensity. Alternatively still, the single, multiplexed, polychromatic optical input beam could be split such that any or all of the resultant multiplexed, polychromatic optical input beams are identical so as to create redundant channels. Alternatively still, the single, multiplexed, polychromatic optical input beam could be split such that certain data channels are routed separately so as to provide security as to those data channels. Thus, the optical filter 64 could be, for example, a standard coupler, a fiber Bragg grating, an interference filter, a bandpass filter, a power splitter, or any other suitable splitting means.

At this point it should also be noted that the present invention ultra-dense wavelength division multiplexing/demultiplexing device can be used simultaneously for multiplexing and demultiplexing operations. For example, the plurality of optical fibers 12a can be used to transmit a corresponding plurality of monochromatic optical input beams 24a and the optical fiber 22a can be used to receive a multiplexed, polychromatic, optical output beam 26a, while simultaneously the optical fiber 22b can be used to transmit a multiplexed, polychromatic, optical input beam 42b and the plurality of optical fibers 12b can be used to receive a corresponding plurality of monochromatic optical output beams 44b.

At this point it should further be noted that it is within the scope of the present invention to provide an ultra-dense wavelength division multiplexing/demultiplexing device in accordance with the present invention using any or all of the concepts and/or features described in U.S. patent application Ser. No. 09/257,045 U.S. Pat. No. 6,137,933 (Attorney Docket No. 34013-00008, Client Reference No. D-97031-CNT), filed Feb. 25, 1999; U.S. patent application Ser. No. 09/323,094 U.S. Pat. No. 6,263,735 (Attorney Docket No. 34013-00010, Client Reference No. D-99001), filed Jun. 1, 1999; U.S. patent application Ser. No. 09/342,142 (Attorney Docket No. 34013-00011, Client Reference No. D-99002), filed Jun. 29, 1999; U.S. patent application Ser. No. 09/382,492 (Attorney Docket No. 34013-00013, Client Reference No. D-99004), filed Aug. 25, 1999; U.S. patent application Ser. No. 09/382,624 U.S. Pat. No. 6,271,970 (Attorney Docket No. 34013-00014, Client Reference No. D-99005), filed Aug. 25, 1999; U.S. patent application Ser. No. 09/363,041 U.S. Pat. No. 6,243,513 (Attorney Docket No. 34013-00023, Client Reference No. D-99014), filed Jul. 29, 1999; U.S. patent application Ser. No. 09/363,042 U.S. Pat. No. 6,236,780 (Attorney Docket No. 34013-00024, Client Reference No. D-99015), filed Jul. 29, 1999; U.S. patent application Ser. No. 09/392,670 (Attorney Docket No. 34013-00025, Client Reference No. D-99016), filed Sep. 8, 1999; and U.S. patent application Ser. No. 09/392,831 U.S. Pat. No. 6,181,853 (Attorney Docket No. 34013-00026, Client Reference No. D-99017), filed Sep. 8, 1999; all of which are hereby incorporated herein by reference. For example, an ultra-dense wavelength division multiplexing/demultiplexing device in accordance with the present invention may be wholly or partially integrated, and different types of lenses and lens configurations may be used.

Finally, it should be noted that the maximum number of arrays is only dependent upon the ability of the lens design to handle more than one array. Specifically, this relates to a basic tradeoff in performance as arrays are stacked next to one another. The farther away an array is placed from the optical axis Z—Z of the device, typically there is a degradation in fiber coupling efficiency since the lens cannot typically perform at very large field heights with high efficiency. Also, as arrays are placed away from the optical axis Z—Z of the device, there is an increased probability of crosstalk. However, by careful lens design, the performance of each array can be made to be the same as other arrays. For example, the inner-most array can be made to have the same performance as the outermost array. This could be useful for WDM systems requiring a very flat response between each of the data channels. Alternately, the placement of the arrays can be such that there is a non-flat, or unusual response (efficiency versus wavelength). The beauty of the present invention approach is that there is no significant insertion loss for creating a WDM device with very high data channel counts. This approach allows processing of more data channels in a more efficient manner than other WDM technologies such as, for example, fiber Bragg gratings or array waveguide gratings (AWGs). Also, the robustness of this approach allows a very large number of data channels to be processed (multiplexed or demultiplexed) in one single WDM device. Thus, the present invention ultra-dense wavelength division multiplexing/demultiplexing device has the benefits of low insertion loss, low crosstalk, low cost, and a very high number of data channels. More specifically, the present invention ultra-dense wavelength division multiplexing/demultiplexing device offers the new and non-obvious advantages of: (1) the ability to increase the data channel throughput (# of data channels) in a WDM device by simply splitting a signal and then attaching corresponding split signal optical fibers to extra input and output positions on the WDM device; (2) the ability to use a WDM device for the multiplexing or demultiplexing for more than one array of data channels without major changes to the lens design of the WDM device; (3) the ability to use a WDM device for bi-directional and simultaneous multiplexing and demultiplexing (use as a duplex mux/demux); (4) the ability to create a redundant or secure WDM device; and (5) the other new and non-obvious advantages that are apparent from the foregoing description.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. An ultra-dense wavelength division multiplexing device comprising:
   a wavelength division multiplexing device for combining at least one plurality of monochromatic optical beams into a corresponding at least one single, multiplexed, polychromatic optical beam, the wavelength division multiplexing device having an input element and an output element;
   a plurality of optical input devices disposed proximate the input element, each of the plurality of optical input devices for communicating a plurality of monochromatic optical beams to the wavelength division multiplexing device for combining the plurality of monochromatic optical beams into a single, multiplexed, polychromatic optical beam; and
   a corresponding plurality of optical output devices disposed proximate the output element, each of the plurality of optical output devices for receiving a corresponding single, multiplexed, polychromatic optical beam.

2. The device as defined in claim 1, wherein the wavelength division multiplexing device comprises:
   a diffraction grating for combining the at least one plurality of monochromatic optical beams into the corresponding at least one single, multiplexed, polychromatic optical beam.

3. The device as defined in claim 2, wherein the diffraction grating is a reflective diffraction grating oriented at the Littrow diffraction angle.

4. The device as defined in claim 2, wherein the diffraction grating is a transmissive diffraction grating.

5. The device as defined in claim 1, wherein the input element is a collimating lens.

6. The device as defined in claim 1, wherein the input element is a boot lens.

7. The device as defined in claim 1, wherein the output element is a focusing lens.

8. The device as defined in claim 1, wherein the output element is a boot lens.

9. The device as defined in claim 1, wherein the plurality of optical input devices is a plurality of input fiber coupling devices, wherein each of the plurality of input fiber coupling devices is arranged into an array of optical fibers, each of the optical fibers for transmitting a monochromatic optical beam to the wavelength division multiplexing device.

10. The device as defined in claim 1, wherein the plurality of optical input devices is a plurality of laser diode coupling devices, wherein each of the plurality of laser diode coupling devices is arranged into an array of laser diodes, each of the laser diodes for transmitting a monochromatic optical beam to the wavelength division multiplexing device.

11. The device as defined in claim 1, wherein the plurality of optical output devices is a plurality of output fiber coupling devices, wherein each of the plurality of output fiber coupling devices maintains at least one optical fiber, each optical fiber for receiving a single, multiplexed, polychromatic optical beam from the wavelength division multiplexing device.

12. An ultra-dense wavelength division demultiplexing device comprising:
   a wavelength division demultiplexing device for separating at least one multiplexed, polychromatic optical beam into a corresponding at least one plurality of monochromatic optical beams, the wavelength division demultiplexing device having an input element and an output element;
   a plurality of optical input devices disposed proximate the input element, each of the plurality of optical input devices for communicating a single, multiplexed, polychromatic optical beam to the wavelength division demultiplexing device for separating the single, multiplexed, polychromatic optical beam into a plurality of monochromatic optical beams; and
   a corresponding plurality of optical output devices disposed proximate the output element, each of the plurality of optical output devices for receiving a corresponding plurality of monochromatic optical beams.

13. The device as defined in claim 12, wherein the wavelength division demultiplexing device comprises:
a diffraction grating for separating the at least one multiplexed, polychromatic optical beam into the corresponding at least one plurality of monochromatic optical beams.

14. The device as defined in claim 13, wherein the diffraction grating is a reflective diffraction grating oriented at the Littrow diffraction angle.

15. The device as defined in claim 13, wherein the diffraction grating is a transmissive diffraction grating.

16. The device as defined in claim 12, wherein the input element is a collimating lens.

17. The device as defined in claim 12, wherein the input element is a boot lens.

18. The device as defined in claim 12, wherein the output element is a focusing lens.

19. The device as defined in claim 12, wherein the output element is a boot lens.

20. The device as defined in claim 12, wherein the plurality of optical input devices is a plurality of input fiber coupling devices, wherein each of the plurality of input fiber coupling devices maintains at least one optical fiber, each optical fiber for transmitting a single, multiplexed, polychromatic optical beam to the wavelength division demultiplexing device.

21. The device as defined in claim 12, wherein the plurality of optical output devices is a plurality of output fiber coupling devices, wherein each of the plurality of output fiber coupling devices is arranged into an array of optical fibers, each of the optical fibers for receiving a monochromatic optical beam from the wavelength division demultiplexing device.

22. The device as defined in claim 12, wherein the plurality of optical output devices is a plurality of photodetector coupling devices, wherein each of the plurality of photodetector coupling devices is arranged into an array of photodetectors, each of the photodetectors for receiving a monochromatic optical beam from the wavelength division demultiplexing device.

23. The device as defined in claim 12, wherein the at least one multiplexed, polychromatic optical beam is at least two multiplexed, polychromatic optical beams, further comprising:
a splitter for splitting a single, pre-split, multiplexed, polychromatic optical beam into the at least two multiplexed, polychromatic optical beams.

24. The device as defined in claim 23, wherein the single, pre-split, multiplexed, polychromatic optical beam is split equally.

25. The device as defined in claim 23, wherein the single, pre-split, multiplexed, polychromatic optical beam is split unequally.

26. The device as defined in claim 23, wherein the single, pre-split, multiplexed, polychromatic optical beam is split according to beam wavelengths.

27. The device as defined in claim 23, wherein the single, pre-split, multiplexed, polychromatic optical beam is split according to beam intensity.

28. A method for increasing channel throughput in a wavelength division demultiplexing device, the method comprising the steps of:
splitting a single, multiplexed, polychromatic optical beam into at least two multiplexed, polychromatic optical beams; and
simultaneously separating each of the at least two multiplexed, polychromatic optical beams into a corresponding at least two pluralities of monochromatic optical beams.

29. The method as defined in claim 28, further comprising the step of:
collimating each of the at least two multiplexed, polychromatic optical beams.

30. The method as defined in claim 28, further comprising the step of:
focusing the corresponding at least two pluralities of monochromatic optical beams.

* * * * *